United States Patent [19]
Nelson et al.

[11] 3,770,925
[45] Nov. 6, 1973

[54] SWITCH MOUNTING STRUCTURE

[75] Inventors: Terrance D. Nelson, Milwaukee; Raymond H. Hannula, West Allis, both of Wis.

[73] Assignee: Allen-Bradley Company, Milwaukee, Wis.

[22] Filed: July 10, 1972

[21] Appl. No.: 270,420

[52] U.S. Cl. .............................. 200/168 C, 248/27
[51] Int. Cl. ............................................ H01h 9/08
[58] Field of Search ................... 200/168 C, 168 G; 248/27; 287/DIG. 8; 292/256, 256.6, 257

[56] References Cited
UNITED STATES PATENTS
2,651,281  9/1953  Nathan ....................... 200/168 C X
864,995   9/1907  Russell ........................... 200/168 C Primary Examiner—J. R. Scott
Assistant Examiner—William J. Smith
Attorney—Barry E. Sammons et al.

[57] ABSTRACT

A molded plastic cover encloses and fastens the actuator sleeve of an electrical switch to a control panel. The cover includes a pair of rotatable wedging members which are operated by a screwdriver to engage a bearing surface on the actuator sleeve. When rotated to a locked position, the wedging members separate the bearing surface from the control panel and thereby draw a clamping surface against the back surface of the control panel to fasten the switch thereto.

8 Claims, 8 Drawing Figures

PATENTED NOV 6 1973

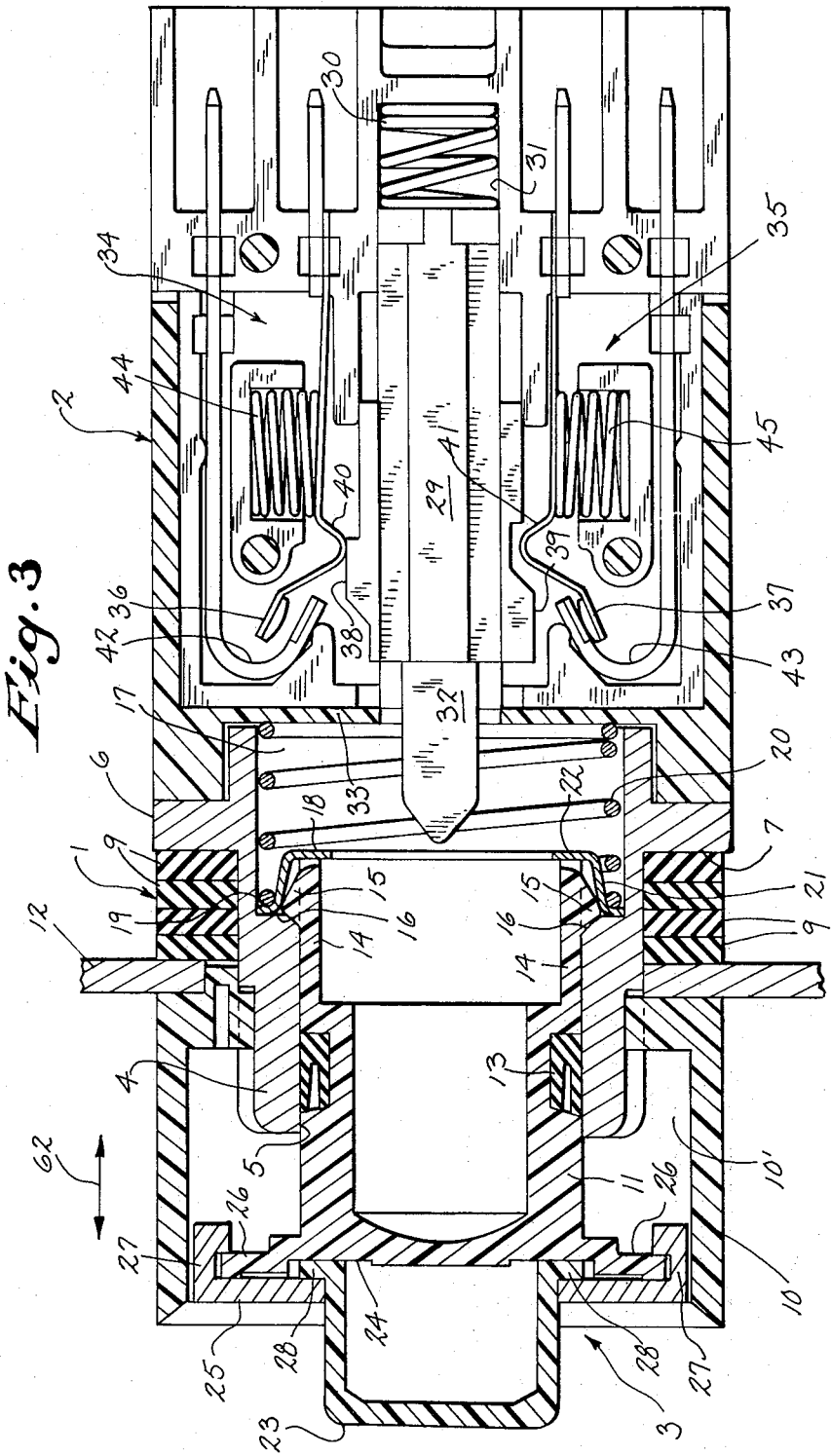

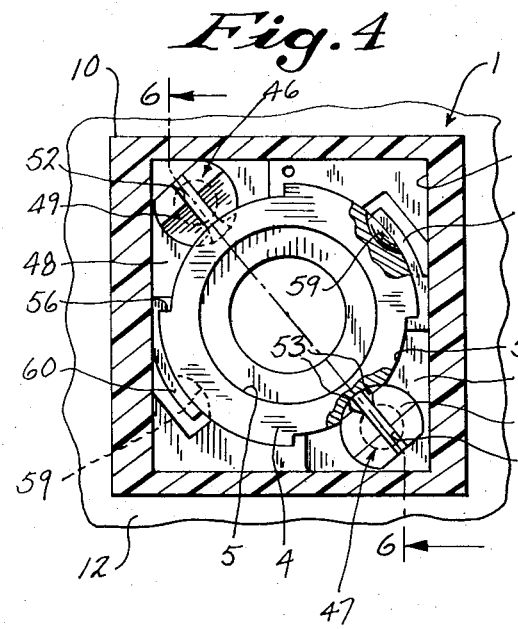
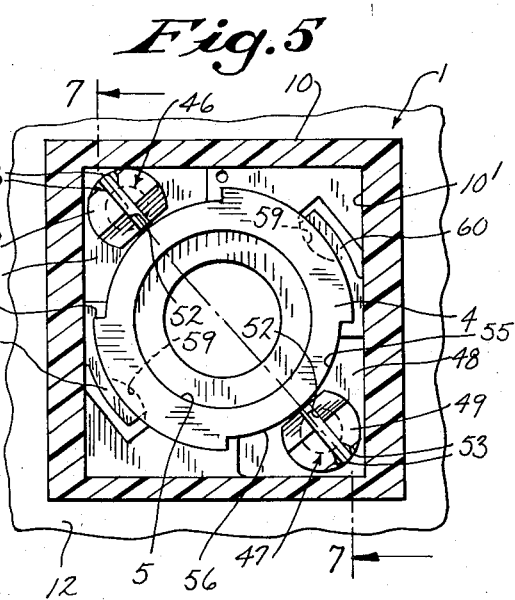
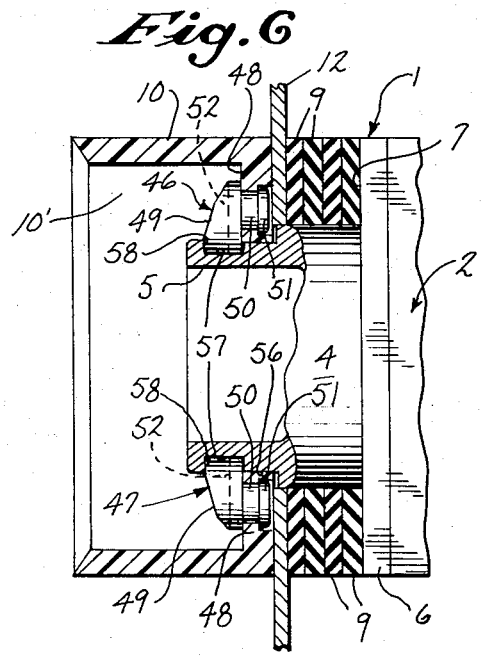
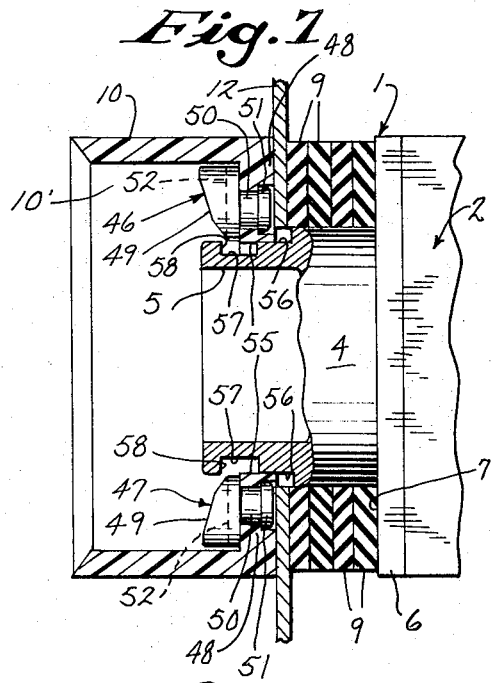
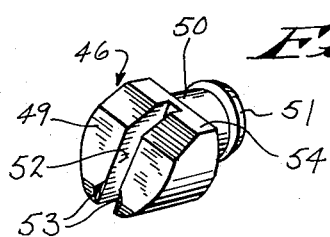

3,770,925

SWITCH MOUNTING STRUCTURE

BACKGROUND OF THE INVENTION

The invention relates to control switches, and more particularly, switches of the pushbutton and rotary selector type commonly attached to control panels associated with electrical apparatus.

Electrical switches are often used in industrial environments where they are employed to control equipment. The switches are often mounted to the front panel of an enclosure which protects them and associated electrical equipment from environmental conditions. The enclosed equipment may be, for example, a motor starter, a motor speed control circuit, or a numerical control director. They are generally mounted in easily accessible and conspicuous locations.

There are a number of requirements which bear upon the design of such switches. First, it is desirable that they be mounted in such a manner that the oil tight integrity of their enclosure is maintained. In addition, the appearance of that portion of the switch actuator which extends through the control panel is important from both a safety and an esthetic standpoint.

Prior electrical switches include a threaded bushing which extends through an opening in the panel. A nut is applied to the bushing and tightened against the front surface of the control panel to fasten the switch thereto. As a result of this method of attachment, the knob or button which operates the switch assumes a generally circular shape such as that shown in U.S. Pat. No. 2,734,953. in recent years there has been an increased interest in providing a switch of square, or rectangular appearance. Efforts made thus far to provide such an appearance include the use of a square cover which is retained to the panel by a metal clasp. The clasp is held beneath the nut holding the switch to the control panel and the cover is snapped into position to enclose the threaded bushing and nut. Although the desired appearance is obtained, the cover is not securely fastened and can be knocked loose. This not only destroys the appearance of the switch, but it also exposes the switch and increases the chance of accidental actuation.

SUMMARY OF THE INVENTION

The present invention relates to an improved means of attaching electrical switches to a control panel. Specifically, the invention includes an actuator sleeve which extends through an opening in the panel; a bearing plate which extends radially from the actuator sleeve to provide a clamping surface that bears against the back surface of the panel; a bearing surface integrally formed to the actuator sleeve and positioned to face the front surface of the panel when the switch is in position; a cover adapted to extend around the perimeter of the actuator sleeve and butt against the front surface of the panel; and a locking mechanism attached to the cover and including a wedging member which is disposed between the front surface of the panel and the bearing surface. The locking mechanism is operable to force the bearing surface away from the panel. The cover may be shaped to provide any desired external appearance, including a square.

A general object of the invention is to provide an improved means of fastening a switch to a control panel. The wedging member is carried by the cover and is completely contained within it. The wedging member is rotated by means of a screwdriver to a locked position which fastens both the cover and switch to the control panel. Although the wedging member is carried by the cover, its operation is independent of the cover's orientation.

Another object of the invention is to provide a means of fastening a cover and switch to a control panel. The locking mechanism may be integrally formed to the cover and therefore virtually inseparable therefrom. As a result, the cover and switch are both securely fastened to the control panel by the operation of the wedging member.

Still another object of the invention is to provide an esthetically pleasing switch, the appearance of which is not constrained by the means used to fasten it to a control panel.

The foregoing and other objects and advantages of the invention will appear from the following description. In the description reference is made to the accompanying drawings which form a part hereof and in which there is shown by way of illustration a preferred embodiment of the invention. Such embodiment does not necessarily represent the full scope of the invention, and reference is made to the claims herein for interpreting the breadth of the invention.

BRIEF DESCRIPTION OF THE DRAWINGS

FIG. 3 is a view in cross section taken along the center line of the switch in FIG. 1, FIG. 4 is a cross section of the switch of FIG. 1 taken on the plane 4—4, FIG. 5 is a view in cross section of the switch of FIG. 1 taken on the plane 5—5, FIG. 6 is a view in cross section of the switch of FIG. 4 taken on the plane 6—6, FIG. 7 is a view in cross section of the switch of FIG. 5 taken on the plane 7—7, and FIG. 8 is an isometric view of the wedging member which forms a part of the invention.

DESCRIPTION OF THE PREFERRED EMBODIMENT

Figure 1:
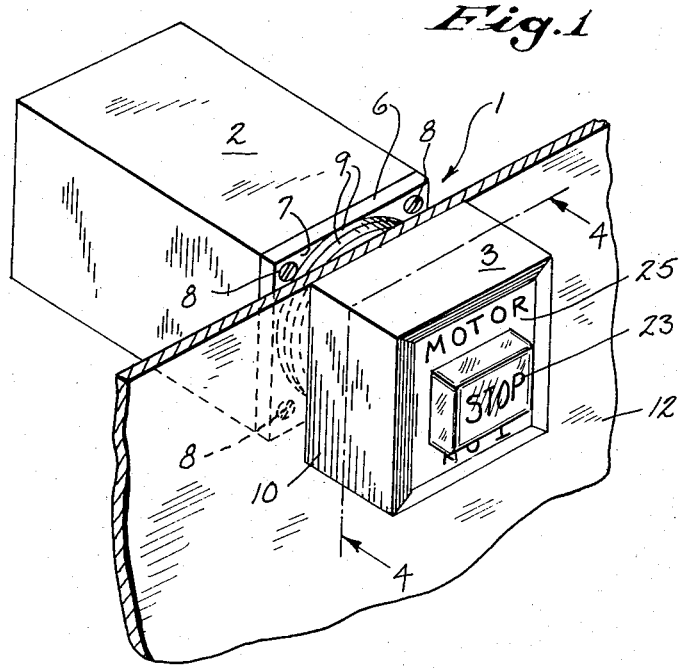
FIG. 1 is an isometric view of an electrical switch attached to a panel with the invented fastener.
Figure 2:
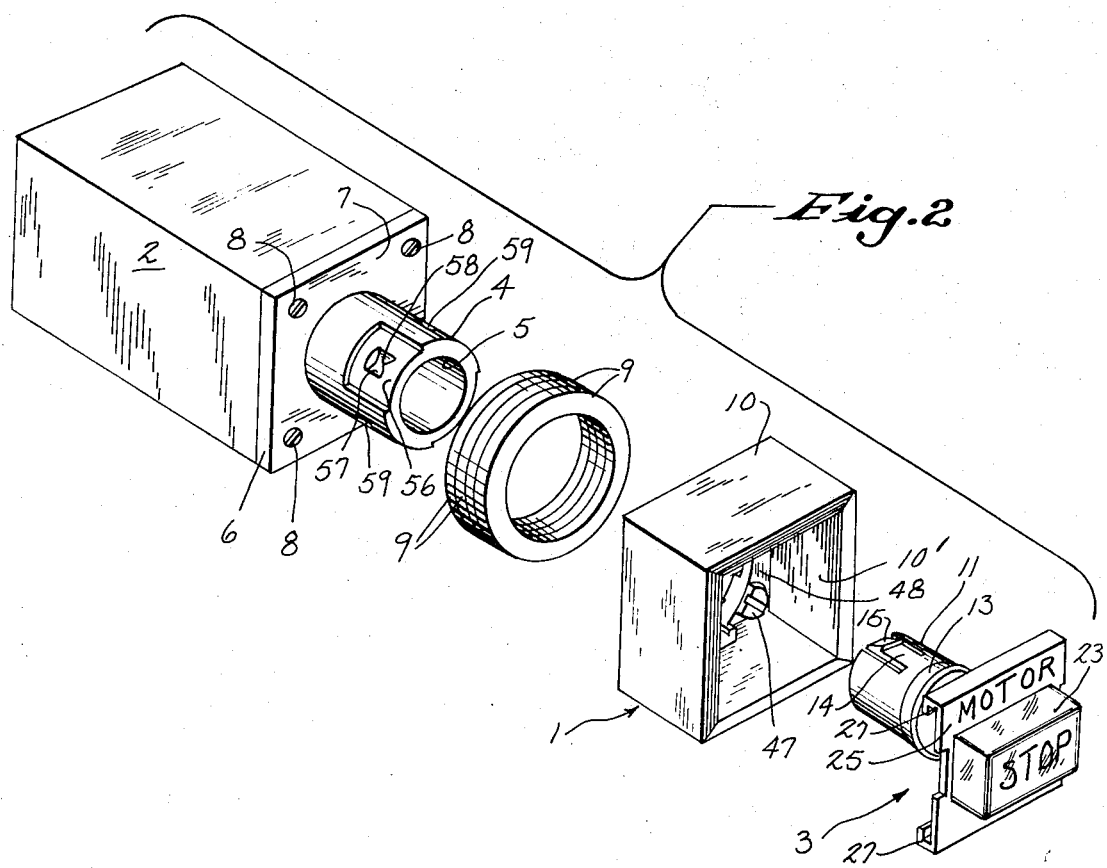
FIG. 2 is an exploded isometric view of the electrical switch of FIG. 1.

Referring to FIGS. 1 and 2, an electric switch adapted for attachment to a control panel 12 includes two portions, an actuator section 1 and a contact block section 2. The actuator section 1 includes a pushbutton mechanism 3 which is connected for reciprocating motion in a central opening 5 of an actuator sleeve 4. The actuator section 1 also includes a rectangular bearing plate 6 which is integrally formed to the actuator sleeve 4 and which extends radially outward from the surface of the actuator sleeve 4 adjacent its back edge. It forms a clamping surface 7 which faces forward and defines a plane perpendicular to the central axis of the actuator sleeve 4. A set of four openings are formed through the bearing plate 6 to receive a set of four mounting screws 8 which extend through the bearing plate 6 and fasten it to the contact block section 2.

When the switch is attached to a control panel, a set of rubber gaskets 9 are placed around the actuator sleeve 4 and the actuator sleeve 4 is inserted through an opening in the control panel from the back side thereof. The gaskets 9 are thus disposed between the clamping surface 7 of the bearing plate 6 and the back surface of the control panel 12. A cover 10 is then positioned around that portion of the actuator sleeve 4 which extends through the panel opening and is securely fastened thereto by a locking mechanism which is to be described below. Finally, the pushbutton mechanism 3 is inserted into the actuator sleeve 4 where it snaps into place. When thus assembled, the cover 10 completely encloses the actuator sleeve 4 and provides an esthetically pleasing appearance to that portion of the switch which is exposed on the front surface of the control panel.

Referring to FIG. 3, the pushbutton mechanism 3 includes a carrier 11 which is inserted into the circular opening 5 in the actuator sleeve 4. The carrier 11 is molded from a rigid plastic and it has a generally circular cylindrical outer surface which slidably engages the inner surface of the actuator sleeve 4. An annular groove is formed around the carrier 11 into which a gasket 13 is inserted and attached to provide a seal against the penetration of oil and other foreign substances. Integrally molded with the carrier 11 is a pair of arms 14 which extend axially into the actuator sleeve 4. The arms 14 are flexible and each contains a knuckle 15 at its extremity. The central opening 5 expands in diameter approximately midway along the length of the actuator sleeve 4 to form a chamber 17 and to define an annular retaining surface 16. The carrier 11 is inserted into the central opening 5 until the knuckles 15 enter the chamber 17 whereupon they are forced radially outward by the arms 14. The carrier 11 thus "snaps" into a retained position within the actuator sleeve 4.

Contained within the chamber 17 is a steel washer 18 which has its outer portion formed to provide a seat 19 that receives one end of a bias spring 20. The bias spring 20 is of slightly less diameter than the chamber 17 and it is compressed to provide a force which seats the washer 18 against the retaining surface 16. A skirt 21 on the washer 18 provides an axial offset between the seat portion 19 and a bearing portion 22 which rests against the end of the carrier 11. This offset provides clearance around the knuckles 15. The force exerted by the spring 20 biases the carrier 11 into an unactuated position in which the knuckles 15 engage the retaining surface 16. The carrier 11 is, however, movable in the axial direction indicated by the arrow 62 to an actuated position. Actuation is accomplished by the manual application of a force to the pushbutton mechanism 3.

The pushbutton mechanism 3 includes a button 23 which is retained to a front surface 24 on the carrier 11 by a face plate 25. A pair of flanges 26 are integrally formed to the front of the carrier 11 to slidably engage a pair of channels 27 formed along opposing edges of the square face plate 25. The channels 27 receive the carrier flanges 26 and retain the face plate 25 thereto. The button 23 is rectangular in shape and includes a pair of flanges 28 which extend outward along a pair of opposing back edges. The button flanges 28 are rigidly retained between the face plate 25 and the front surface 24 of the carrier 11.

When thus assembled, the button 23, face plate 25 and carrier 11 operate as a unit. The face plate 25 conforms closely to the interior dimensions of the cover 10 to form a compartment 10 for that portion of the actuator section 1 which extends forward of the control panel 12. It can be marked appropriately and readily removed and replaced with another similar face plate 25. The button 23 may also be removed and replaced with a similar button carrying the appropriate designation. The button may be "raised" as shown in the drawings, or flush with the face plate 25. The button 23 may also be formed from a transparent or translucent material.

The contact block section 2 contains a pair of contact cartridges, one of which is shown in FIG. 3. Each contact cartridge includes a plunger 29 slidably retained within the contact cartridge for limited axial movement between unactuated and actuated positions. The plunger 29 is biased in its unactuated position by a spring 30 which is retained within a compartment 31 integrally formed in the contact cartridge framework. The plunger 29 includes an operator 32 which extends through a forward wall 33 in the contact block section 2 and into the chamber 17 of the actuator section 1. When in its unactuated, or forward position, the plunger operator 32 is positioned immediately adjacent the washer 18 in the chamber 17. Thus, when the carrier 11 is manually operated, the washer 18 contacts the operator 32 and pushes the plunger 29 to its actuated, or rearward position.

Contained within each contact cartridge is a pair of single pole, single throw switches 34 and 35. The switches 34 and 35 are located on opposite sides of the plunger 29 and each includes a movable contact 36 and 37 which is operated by the axial motion of the plunger 29. A normally open cam 38 is integrally formed along the side of the plunger 29 adjacent the switch 34, and a normally closed cam 39 is integrally formed along the opposing side, adjacent the other switch 35. The movable contacts 36 and 37, are made of beryleum-copper which has been shaped to form a cam follower 40 and 41. One end of each movable contact 36 and 37 is embedded in the framework of the contact cartridge and its other end is movable between an open position and a closed position. In the closed position the movable contact 36 and 37 bears against a stationary contact 42 and 43. Each switch 34 and 35 also includes a spring 44 and 45 positioned to bias the movable contact 36 and 37 into its closed position.

The switches 34 and 35 are operated by the action of the cams 38 and 39 on the cam followers 40 and 41. The normally open cam 38 forces the movable contact 36 open when the plunger 29 is in its unactuated position, and the cam 39 opens the movable contact 37 when the plunger 29 in is its actuated position. The switch 34 is thus normally open and the switch 35 is normally closed. It should be apparent, however, that other modes of operation can be easily obtained.

Referring to FIGS. 4–8, the attachment of the cover 10 and actuator sleeve 4 to the control panel 12 is shown. The cover 10 is formed of molded plastic and has four walls which define a compartment 10' and which provide a square external appearance. The cover 10 supports a locking mechanism which includes a pair of wedging members 46 and 47 contained within the compartment at opposing corners thereof. Each is rotatably attached to a web 48 which is integrally formed with the cover 10. Each web 48 extends radially inward in a plane perpendicular to the cover walls to form a pair of opposing edges 55 which define a generally circular opening through the center of the cover 10. The wedging members 46 and 47 each include a head portion 49 and a shaft portion 50. The shaft of each extends through an opening in the web 48 to which it is mounted and a flange 51 is formed on its outer end to rotatably fasten it to the cover 10. A slot 52 adapted to receive a screwdriver is formed in the top surface of each wedging member head 49 and the top surface is beveled in the direction of the slot 52. At the thickest portion of each head 49 a detent 53 is formed by beveling the walls of the slot 52. Each head 49 is generally circular in cross section, however, a segment is removed to form a flattened surface 54.

As shown best in FIG. 2, a pair of opposing recesses 56 are formed on the outside surface of the actuator sleeve 4 to mate with the edges 55 of the webs 48 and to thus circumferentially align the cover 10 with respect to the switch. The outer surface of the actuator sleeve 4 is further recessed to form a pair of opposing notches 57 located within and centered in the recesses 56. The forward wall of each notch 57 forms a bearing surface 58 which faces the front surface of the control panel 12 when the switch is attached thereto. Each bearing surface 58 includes a protruding portion which is shaped to mate with the detent 53 in its associated wedging member 46 or 47.

The wedging members 46 and 47 are rotatable between an unlocked position shown in FIGS. 5 and 7, and a locked position as shown in FIGS. 4 and 6. In the unlocked position, the flat surfaces 54 are positioned to face one another, a position in which the wedging members 46 and 47 do not extend within the opening formed by the edges 55 of the webs 48. Clearance is thus provided for the insertion of the forward end of the actuator sleeve 4 into the cover 10. When the wedging members 46 and 47 are rotated, the beveled head 49 on each engages its associated bearing surface 58 and draws the actuator sleeve 4 further into the cover 10 and thus further through the opening in the control panel 12. The rotation of the wedging members 46 and 47 separates the bearing surface 58 from the front surface of the control panel 12 to draw the clamping surface 7 toward the back surface of the control panel 12. This motion compresses the gaskets 9 and rigidly fastens the switch to the control panel 12. When fully rotated to the lock position, the detent 53 on each wedging member head 49 becomes oriented with the contoured bearing surface 58 and is locked in position as shown in FIGS. 4 and 6.

When mounting the electrical switch to the control panel 12, the actuator sleeve 4 is inserted through an opening in the panel 12 from the back side thereof. The cover 10 is then slipped into place over the actuator sleeve 4 and rigidly fastened by turning the wedging members 46 and 47 with a screwdriver. Occasionally, however, due to the large size of the control panel 12, it is not possible to hold the switch in place while the wedging members 46 and 47 are being locked. Therefore, a set of temporary retainers are provided to hold the switch in place while fastening is being completed. These temporary retainers include a pair of detents 59 formed on the surface of the actuator sleeve 4 in quadrature with the notches 57. An associated pair of molded plastic detent mechanisms 60 are integrally formed on the cover 10 to operate in the plane of the webs 48 and located circumferentially in quadrature with the wedging members 46 and 47. The detents 59 are positioned axially on the actuator sleeve 4 such that when the sleeve is positioned within the cover 10 to bring the gaskets 9 into contact with the control panel 12, the detent mechanisms 60 flex radially inward into mating engagement with the detents 59. The snap action of the detent mechanisms 60 temporarily hold the switch to the control panel 12 until the wedging members can be locked.

It should be apparent to those skilled in the art that numerous modifications can be made to the above described structure. For example, the shape of the cover 10 can be altered to present the desired external appearance. Also, the structure and appearance of the button 23 and face plate 25 can be altered as desired. These and other modifications can be made without departing from the fastening concept disclosed herein and reference is made to the following claims for interpreting the breadth of the invention.

We claim:

1. In an electrical switch having an actuator sleeve which is extendable through an opening in a panel for attachment thereto, an improved means of fastening the switch to the panel the combination comprising:

a bearing plate attached to the actuator sleeve and extending radially outward therefrom to provide a clamping surface which faces the back surface of the panel;

a bearing surface formed on said actuator sleeve axially forward of said bearing plate to face the front surface of said panel when said actuator sleeve is inserted through an opening in the panel;

a cover defining a compartment for the forward end of the actuator sleeve; and a wedging mechanism attached to the cover and including a wedging member which is positioned alongside said actuator sleeve and inside said compartment, which is rotatable about an axis that is parallel to, but eccentric from the central switch axis, and which is rotatable between a locked position and unlocked position, wherein said wedging member is disposed between said bearing surface and the front surface of the panel and it separates said surfaces to draw the clamping surface forward into engagement with the back surface of the panel when rotated to its locked position.

2. In an electrical switch having an actuator sleeve which is extendable through an opening in a panel for attachment thereto, an improved means of fastening the switch to the panel the combination comprising:

a bearing plate attached to the actuator sleeve and extending radially outward therefrom to provide a clamping surface which faces the back surface of the panel;

a bearing surface formed on said actuator sleeve axially forward of said bearing plate to face the front surface of said panel when said actuator sleeve is inserted through an opening in the panel;

a cover which includes a plurality of walls which define a compartment that surrounds the forward end of the actuator sleeve, and which includes a web connected to one wall and disposed within said compartment; and a wedging mechanism attached to the cover and including a wedging member which is rotatably connected to the web on said cover and is rotatably operable between a locked and unlocked position, wherein said wedging member is disposed between said bearing surface and the front surface of the panel and when rotated into its locked position engages said bearing surface and separates said surfaces to draw the clamping surface forward into engagement with the back surface of the panel.

3. In an electrical switch having an actuator sleeve which is extendable through an opening in a panel for attachment thereto, an improved means of fastening the switch to the panel the combination comprising:
- a bearing plate attached to the actuator sleeve and extending radially outward therefrom to provide a clamping surface which faces the back surface of the panel;
- a bearing surface formed on said actuator sleeve axially forward of said bearing plate to face the front surface of said panel when said actuator sleeve is inserted through an opening in the panel;
- a cover which includes a plurality of walls which define a compartment that surrounds the forward end of the actuator sleeve, and which includes a web connected to one wall and disposed within said compartment; and
- a wedging mechanism attached to the cover and including a wedging member having a shaft portion which extends through and is rotatably attached to said web to rotate about an axis parallel to the switch central axis between a locked and unlocked position, and having a head portion which is disposed between said bearing surface and the front surface of the panel, said head portion having a beveled top surface which engages said bearing surface when the wedging member is rotated to its locked position and which separates said bearing surface from the front surface of said panel to thereby draw the clamping surface forward into engagement with the back surface of the panel.

4. The switch fastening means of claim 3 in which said cover includes four walls which define a rectangular compartment and there are a pair of webs and associated wedging members located in opposing corners of said compartment, wherein the wedging members are separately operable to engage said bearing surface at points located on opposing sides of said actuator sleeve.

5. The switch fastening means of claim 4 in which a slot is formed in the top surface of the head portion of each wedging member.

6. The switch fastening means of claim 4 which includes a temporary retainer comprising a detent formed on the surface of the actuator sleeve and a detent mechanism integrally formed with the cover and located within the compartment, said detent mechanism being operable when said actuator sleeve is inserted through the panel opening and into the compartment to engage said detent and hold the switch and cover to the panel.

7. The switch fastening means of claim 6 in which said temporary retainer includes a pair of detents on said actuator sleeve and a pair of detent mechanisms on the cover.

8. The switch fastening means of claim 7 in which the cover, webs and detent mechanisms are formed from a single piece of molded plastic material.

* * * * *